UNITED STATES PATENT OFFICE.

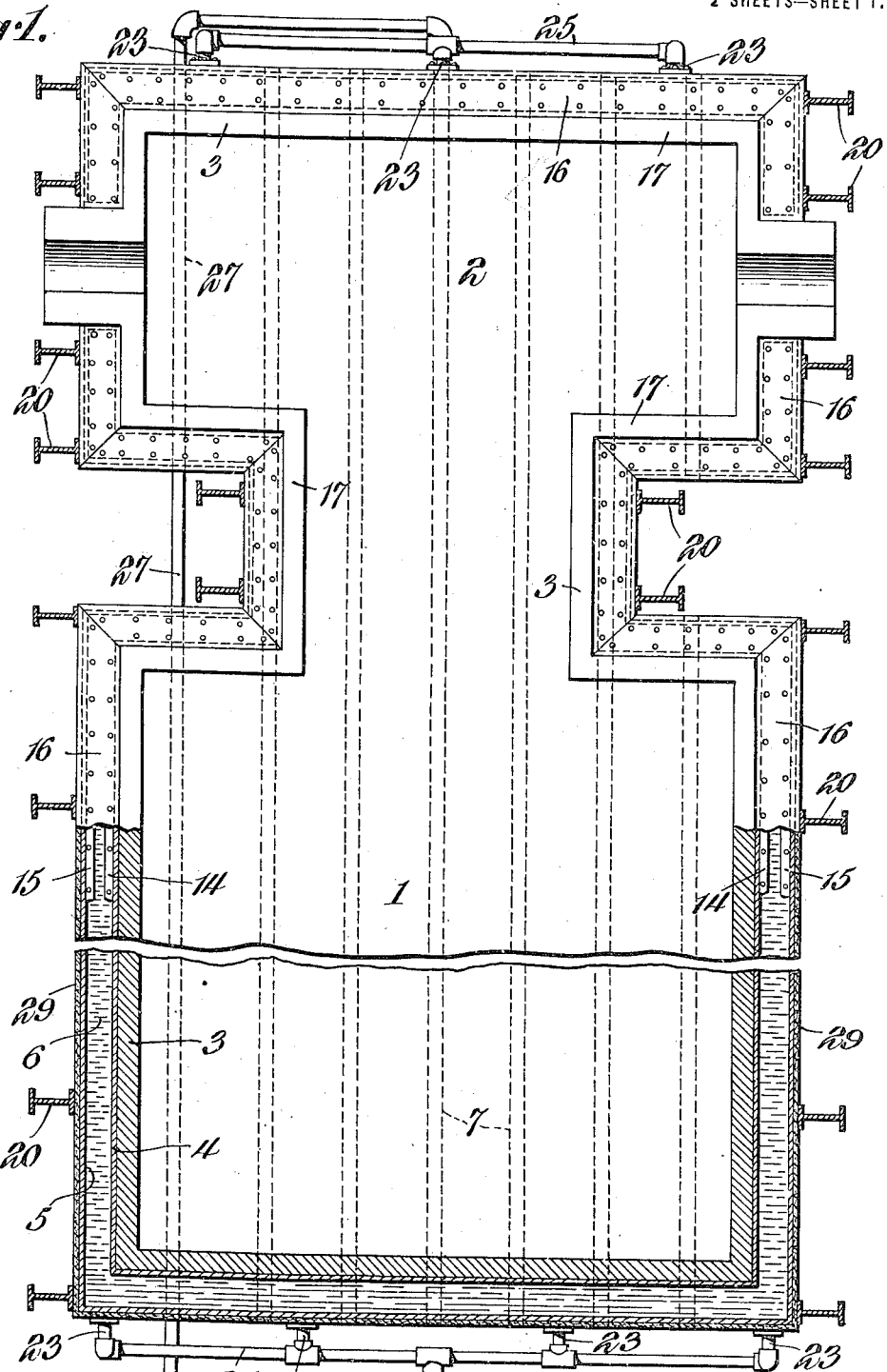

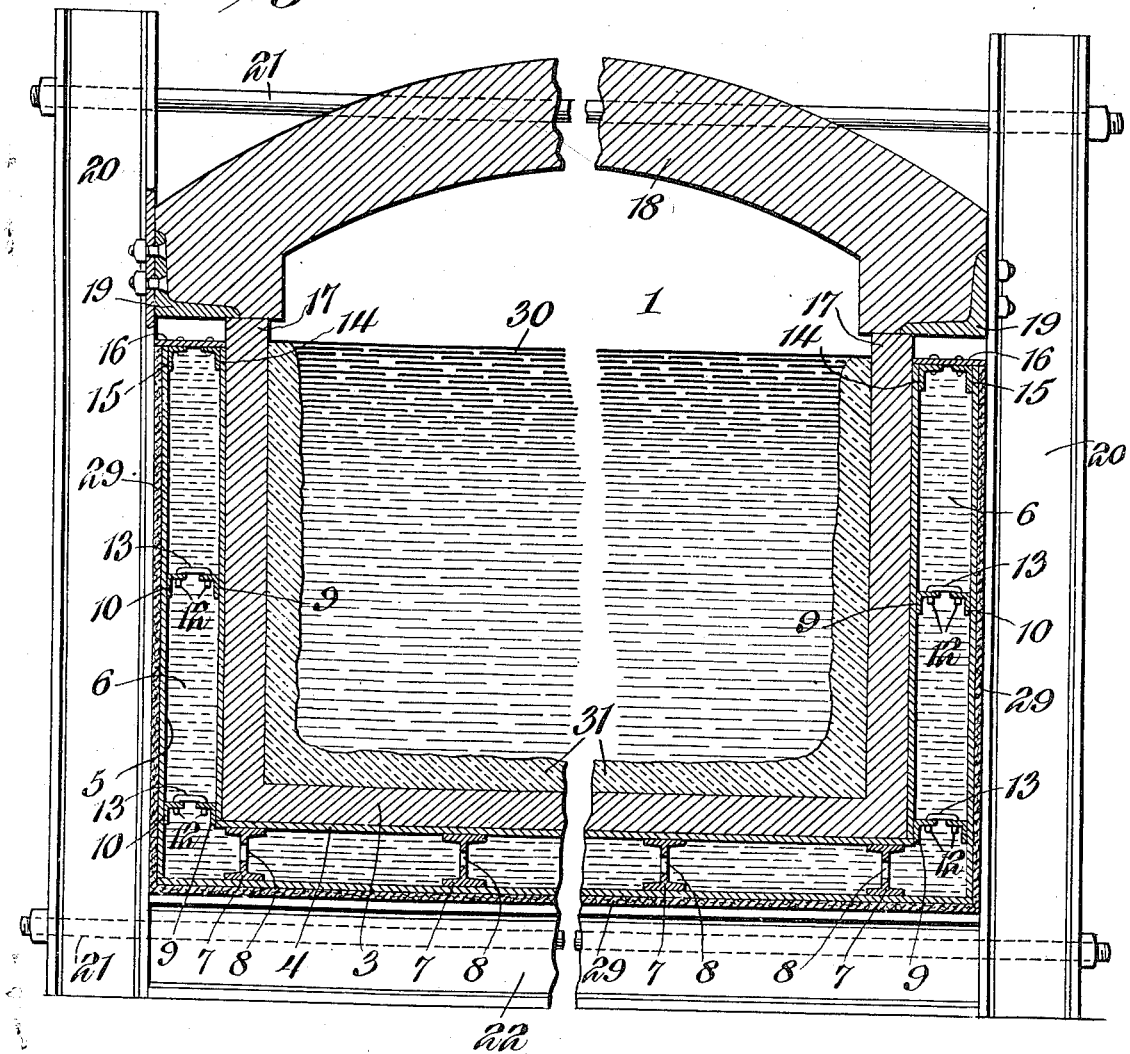
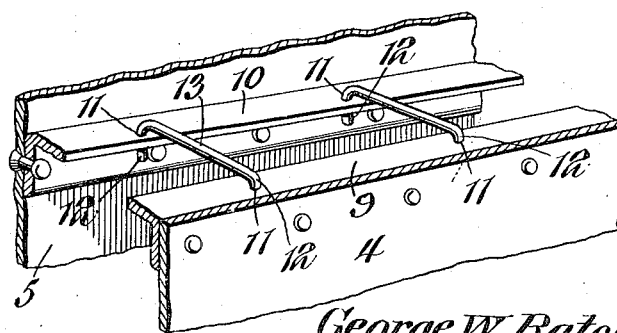

GEORGE WILLIAM BATCHELL, OF WELLSBURG, WEST VIRGINIA.

GLASS-FURNACE.

1,181,283. Specification of Letters Patent. Patented May 2, 1916.

Application filed February 25, 1913. Serial No. 750,611.

*To all whom it may concern:*

Be it known that I, GEORGE W. BATCHELL, a citizen of the United States, residing at Wellsburg, in the county of Brooke and State of West Virginia, have invented a new and useful Glass-Furnace, of which the following is a specification.

This invention has reference to improvements in glass furnaces, and more particularly to means for maintaining the lining of the furnace where engaged by the glass at such a temperature that molten glass is not brought into direct contact with the lining, but is shielded and separated therefrom by a layer of solidified glass maintained in such condition by a continued chilling of the walls of the furnace.

The present invention is susceptible of application to existing furnaces and, therefore, is in the nature of an attachment and may be so applied to the walls of the furnace as to extend around them exterior thereto and also underlie the bottom of the furnace.

Glass furnaces are customarily lined with refractory material since molten glass has a very high temperature, but molten glass has a deteriorating effect upon the refractory material used, so that it becomes necessary to reline furnaces every ten to sixteen months. By the present invention the lining is made to last two or more years, thus resulting in a material saving and also causing the production of a better grade of glass.

In accordance with the present invention the walls of the furnace made of suitable firebrick have applied exterior thereto two shells of sheet metal spaced apart and mechanically connected so as to produce a water jacket both around the side walls of the furnace and beneath the bottom thereof. The water jacket thus provided is supplied with water at a suitably low temperature as from a refrigerating machine, of which numerous forms are in existence. Despite the high temperature of the molten glass the cooling jacket sufficiently chills the refractory walls of the furnace and maintains them at the suitably low temperature to cause the glass to congeal against these walls to a thickness sufficient to protect the walls from the direct effects of the molten glass. The inner walls of the glass furnace are, therefore, of glass, and while, of course, the congealed glass may still be very hot, the deleterious effect of the molten glass upon the lining is so retarded that the lining will last far longer than if the molten glass was in direct contact therewith. Moreover, the low temperature of the water is further maintained by applying to the outer shell of the jacket a heat insulating material, such as asbestos, whereby an exchange of heat from the exterior of the water jacket to the water within the jacket is to a very large extent prevented, and this without further expense after the initial installation.

The invention also includes certain structural features which permit a removal of the water jacket or the renewal of the lining without effect upon the other parts of the furnace.

The invention will be best understood from a consideration of the following detailed description, taken in connection with the accompanying drawings, forming a part of this specification, with the further understanding that while the drawings show a practical embodiment of the invention, the latter is not confined to any strict conformity with the showing of the drawings but may be changed and modified so long as such changes and modifications mark no material departure from the salient features of the invention.

In the drawings:—Figure 1 is a plan view of the body portion of a glass furnace, with some parts in horizontal section, constructed in accordance with the present invention, some extraneous parts being shown diagrammatically. Fig. 2 is a vertical cross section of a glass furnace equipped with the present invention and also including a crown or roof therefor. Fig. 3 is a fragmentary perspective view of a portion of the water jacket showing the manner of holding the inner and outer members thereof in spaced relation.

Referring to the drawings there is shown a glass furnace provided with a melting section 1 and a gathering section 2, both of which are provided with a lining 3 of refractory material, such as a fire brick flux clay lining, which may be about four inches thick. Surrounding the sides of the wall or lining 3 and also underriding the bottom thereof is a shell 4, and surrounding this shell both at the sides and bottom is another shell 5 of larger dimensions, so as to provide about and underneath the bottom thereof a chamber 6 designed to receive water, as will hereinafter appear. In the space between the bottom portions of the two shells 4 and 5 there are located a suitable number of girders 7, which may be made of I beams with the webs pierced by perforations 8, so that the compartments between the beams have free intercommunication. The number of beams 7 employed and their size depend upon the conditions to be met in each furnace, so that no especial directions can be given, this being part of the work of the constructing engineer. Nor is it essential that the webs of the beams 7 have passages therethrough.

Extending along the outer faces of the side and end walls of the shell 4 and the corresponding inner faces of the shell 5 are angle strips 9, 10, respectively, in matching relation one to the other with corresponding webs directed one toward the other, but still spaced apart, the other webs being riveted or otherwise made fast to the corresponding shells. The facing webs have matching passages 11 for the reception of corresponding hook ends 12 of spacing and connecting links 13, which may be of substantially U form with very short legs and greatly extended yokes, thus preventing either the spreading or collapsing of the water jacket or chamber 6. Entering the upper end of the water jacket are spaced angle strips 14, 15, respectively, fast to and inset from the side edges of cover plates 16 for the compartment 6, so that this compartment is closed in at the top and made water tight with the sides of the cover overriding the top edges of the shells 4 and 5, in order that water may be forced through the water jacket in such quantities as may be found necessary. The angle strips 14, 15 enter the chamber 6 and are engaged by the upper ends of the shells 4 and 5 so that these shells are braced and held apart thereby.

The side walls of the lining 3 are carried to a somewhat greater height than the water jacket, as indicated at 17, this additional height being usually about two inches, and resting on these side walls are marginal portions of a crown or cover 18 customarily made of silica brick, this crown being further supported by suitably massive angle beams 19 carried by an appropriate number of buckstaves 20 connected together at top and bottom by rods 21, while between the lower ends of these buckstaves there extend supporting I beams 22 upon which the bottom of the water jacket may rest. At opposite sides or ends the water jacket is entered by pipes 23 which may all connect to respective headers 24, 25, connected by pipes 26, 27, respectively, to a refrigerating device 28, simply indicated in the drawings by a rectangle, since the construction of the refrigerating device has nothing to do with the present invention, and any of the well known types of refrigerating machines may be employed, the purpose being to supply the water jacket with water at a sufficiently low temperature for the purpose of the invention, and to maintain this water in circulation through the water jacket.

The exterior wall of the shell 5 is covered with a layer 29 of heat insulating material such as asbestos or any other suitable material, whereby the water within the water jacket is protected from the effect of the temperature of the atmosphere surrounding the furnace, wherefore the only material loss of heat from this cooling water is through the inner shell to the fire brick lining 3, and from the latter to the mass of molten glass within the furnace, this mass being indicated at 30. Since the water supplied to the chamber 6 is, or may be, at a low temperature such as would be applied by a refrigerating machine commonly known as an ice machine, the lining 3 is maintained by a suitable circulation of the water through the chamber 6 at such a low temperature that the molten glass becomes congealed next to the lining 3 in the form of a layer 31 of solid or congealed glass, which may reach a thickness approximating that of the lining 3, thus protecting the lining 3 from the direct effects of the molten glass and commensurately prolonging the life of such lining 3.

The water jacket structure may be applied to any installed glass furnace such as may be in use at the present time, and the furnace may be relined without any difficulty, or, if necessary, the cooling arrangement may be removed without interference with the rest of the furnace, in which case the side walls constituting the corresponding part of the lining 3 will remain to help support the roof or crown.

The chilled glass will adhere firmly to the refractory lining, and not only saves such lining from being slowly eaten away by the molten glass, but the resultant glass is of better quality than heretofore.

What is claimed is:—

1. A glass furnace provided with sustaining buckstaves, a cover or crown carried by the buckstaves, a water jacket interior to the buckstaves, and upright walls and a floor of refractory material interior to the water jacket and underridden thereby, said walls and floor inclosing a chamber designed to contain molten glass, and the water jacket occupying the space between the upright refractory walls and the buckstaves with the refractory walls rising to a greater height than the water jacket.

2. A glass furnace provided with upright and bottom walls of refractory material with a shell exterior to said upright and bottom walls, another shell exterior to the first-named shell and spaced therefrom both at the sides and bottom to provide a continuous water chamber around and beneath the furnace, and spacing and stiffening members between the upright facing walls of the shells, said members being constructed for ready removal from the shells without the aid of tools and constituting the sole means of connecting the two shells together.

3. A glass furnace having a chamber designed to contain molten glass with walls of refractory material, a shell exterior to and with which the walls engage, another shell nesting the first-named shell and spaced therefrom to provide a water chamber, means for supplying water to the water chamber to cool that portion of the contents of the furnace where engaging the refractory walls to there congeal the glass, and connecting members engaging the facing walls of the two shells to space them apart, said connecting members being constructed for ready removal from engagement with the shells without the aid of tools and constituting the sole means of connecting the two shells together.

4. A glass furnace having the side walls and bottom built of refractory material to provide a chamber for molten glass, a metallic shell inclosing the side and bottom walls of refractory material and rising to a less height than the side walls, another metallic shell of greater depth than and nesting the first-named shell and spaced therefrom both at the sides and bottom, supporting beams between the bottom portions of the two shells and serving as spacing members therefor and supporting members for the refractory material, readily removable connecting members extending between the side walls of and spacing the shells, a cover bridging the space between the top portions of the shells, buckstaves exterior to and engaging the outer shell, and a crown or cover for the furnace supported by the buckstaves above the side walls of refractory material and the water jacket formed by the two nested shells.

5. In a glass furnace, a water jacket comprising two spaced shells one nesting the other and having their upper edges in spaced relation one to the other, and a cover member for the water jacket comprising a plate of a width to bridge the space between the upper edge of the two spaced shells and rest thereon, said plate being provided with spaced angle members in inset relation to its edges and at a distance apart to enter the upper end of the water jacket between the shells in engagement with the inner faces thereof.

6. In a glass furnace, a water jacket for the exterior thereof comprising two spaced shells having interior longitudinal matching flange strips with matching passages therethrough, and links each provided with angle ends adapted to the matching passages whereby the links serve as spacing members resistant to either spreading or collapse of the shells and are readily removable at any time for the dismantling of the water jacket.

7. A glass furnace comprising upright fire brick walls constituting the main walls of the furnace, a water jacket exterior to the main walls and rising to a less height than the main walls, buckstaves exterior to the water jacket, angle beams carried by the buckstaves in spaced relation to the upper end of the water jacket, and coinciding with the upper edge of the main walls, and a cover member for the furnace carried by the angle beams in close relation to the upper edges of the main walls.

8. In a glass furnace, a water jacket for the exterior thereof comprising two nested shells in spaced relation one to the other, and links connecting and spacing the side walls of the shells and constructed for ready removal from the shells without the aid of tools, and constituting the sole means of connecting the two shells together, whereby the water jacket may be readily dismantled and its walls are rendered resistant to both compressive and extensive forces.

In testimony, that I claim the foregoing as my own, I have hereto affixed my signature in the presence of two witnesses.

GEORGE WILLIAM BATCHELL.

Witnesses:
CLARENCE E. JACOBS,
K. C. BRASHEAR.